United States Patent [19]

Morrey et al.

[11] Patent Number: 4,870,682
[45] Date of Patent: Sep. 26, 1989

[54] TELEVISION SCRAMBLING SYSTEM

[75] Inventors: Walter T. Morrey, Winchester; Henry L. Hansen, Fairfax, both of Va.

[73] Assignee: Household Data Services (HDS), Reston, Va.

[21] Appl. No.: 18,439

[22] Filed: Feb. 25, 1987

[51] Int. Cl.[4] .................. H04L 9/02; H04N 7/167; H04B 1/66
[52] U.S. Cl. ........................... 380/46; 380/7; 380/10; 380/19; 380/20; 358/133; 358/135; 381/31; 375/30; 375/122; 455/72
[58] Field of Search ............ 380/7, 9, 10, 19, 20, 380/43, 46; 358/135, 133, 36, 167; 381/29-31; 375/30, 122; 333/14; 455/72

[56] References Cited

U.S. PATENT DOCUMENTS

| | | |
|---|---|---|
| 3,489,851 | 1/1970 | Melchior . |
| 3,502,986 | 3/1970 | Lucky ........................ 357/122 X |
| 3,504,289 | 3/1970 | Pfeiffer et al. . |
| 3,808,536 | 4/1974 | Reynolds ........................ 380/46 |
| 4,091,423 | 5/1978 | Branscome . |
| 4,172,968 | 10/1979 | Steinberg et al. ............... 380/43 |
| 4,261,014 | 4/1981 | Lee . |
| 4,295,223 | 10/1981 | Shutterly ........................ 333/14 X |
| 4,308,556 | 12/1981 | Osaka . |
| 4,329,711 | 5/1982 | Cheung ........................ 380/20 |
| 4,336,553 | 1/1982 | den Toonder et al. ............ 380/20 |
| 4,388,643 | 6/1983 | Aminetzah . |
| 4,396,947 | 8/1983 | Cheung ........................ 380/20 |
| 4,403,252 | 9/1983 | Ragan et al. . |
| 4,443,817 | 4/1984 | Faroudja . |
| 4,484,027 | 11/1984 | Lee et al. . |
| 4,504,864 | 3/1985 | Anastassiou et al. . |
| 4,558,361 | 12/1985 | Catros ........................ 358/135 |
| 4,665,436 | 5/1987 | Osborne et al. ............... 358/135 X |
| 4,680,791 | 7/1987 | Kato et al. .................... 380/20 |
| 4,700,387 | 10/1987 | Hirata ........................ 380/20 |
| 4,719,642 | 1/1988 | Lucas ........................ 375/30 |
| 4,754,481 | 6/1988 | Feggeler ........................ 380/41 |

Primary Examiner—Thomas H. Tarcza
Assistant Examiner—Linda J. Wallace
Attorney, Agent, or Firm—Burns, Doane, Swecker & Mathis

[57] ABSTRACT

A signal scrambling system is provided in which the scrambler includes a transition limiter which limits the size of changes in the amplitude of the input clear signal, a device for generating a pseudo random signal and combining the pseudo random and clear signals, and a transposer for reducing the bandwidth of the channel needed for the scrambled signal. The descrambler includes another pseudo random signal generator and device for combining the random signal with the received scrambled signal, as well as another transposer, for recovering a descrambled signal. The system minimizes the power bandwidth of the channel necessary to transmit accurately the scrambled signal which contains no vestiges, not even an average intensity, of the original input signal.

12 Claims, 3 Drawing Sheets

TELEVISION SCRAMBLING SYSTEM

BACKGROUND OF THE INVENTION

The present invention relates to enciphered electronic communication, and more particularly to systems for real-time scrambling of television signals.

With the continued advance of technology, it has become a relatively simple matter for anyone sufficiently motivated to eavesdrop on an increasing volume of electronic communications. This flow of information takes many forms including, among others, data exchanges between computers, telephone conversations, and television broadcasts. In the last category are conventional television including direct and satellite broadcasts and special-purpose TV including teleconference and surveillance transmissions.

Since some of these TV signals represent sensitive information, a device for enciphering or scrambling the TV signals to render the transmitted information unintelligible to anyone unauthorized to receive it is desirable. U.S. Pat. No. 4,484,027 discloses a system for scrambling subscription television signals to prevent non-paying access by system subscribers and others. The TV signals are combined with the output of a pseudo random number (PN) generator and the result is transmitted to a receiver equipped with a descrambler which has another PN generator. The two PN generators are synchronized and the TV signal is deciphered through a system of user ID codes and a cipher key. The disclosed scrambling system is particularly directed to using ciphers for which the keys are changed on a regular basis and are effective only for non-delinquent subscribers.

Another scrambling system is disclosed in U.S. Pat. No. 4,091,423 which is directed to enciphering conventional synchronous digital data communication such as that used by a document facsimile transmission system. A low-rate digital data stream formed by scanning a document with a photocell is combined with a randomized data stream. The scrambled signal is transmitted to a receiver which includes means for generating a random data stream synchronized with the transmitter. The transmitted scrambled data is deciphered by derandomizing the data stream with the result being used to reconstruct the transmitted document. However, the data rate of the facsimile signal is only 2400 bits per second which is significantly less than the 4 megabytes per second used for some TV signals.

Neither of the two systems disclosed in the patents completely randomizes a TV signal so that no vestiges of the transmitted pictures remain in the scrambled output. Abrupt brightness transitions such as switching on a lamp or imaging a high-contrast edge are clearly discernible in the scrambled output, thus compromising the covertness of the communication link.

SUMMARY OF THE INVENTION

It is therefore an object of the present invention to provide a TV scrambling system by which no vestiges, not even an average intensity, of the unciphered signal appear in the scrambled signal.

It is also an object of the present invention that the frequency bandwidth of the scrambled signal be substantially equal to the bandwidth of the unscrambled signal, with the characteristics of the communication channel appropriately controlled.

It is a further object that the ciphering algorithm should correct for some types of signal errors caused by the communication channel.

These and other objects are provided by a scrambling system in accordance with the present invention which comprises a scrambler and a descrambler. The scrambler includes a transition limiter for limiting the size of changes in the amplitude of an input clear signal, means for generating a pseudo random signal and combining the pseudo random and clear signals, and a transposer for reducing the bandwidth of the channel needed for the transmitted scrambled signal. The descrambler includes another means for generating the random signal, means for combining the random signal with the received scrambled signal, and another transposer for recovering the final descrambled signal. In one embodiment, means for integrating the final descrambled signal may be included in the descrambler.

BRIEF DESCRIPTION OF THE DRAWINGS

The present invention will be more clearly understood from the following detailed description read in conjunction with the drawings in which.

DETAILED DESCRIPTION

The following description is given in the context of video signals, but it will be understood that the system and method of the present invention operate with any electromagnetic signal.

Figure 1:
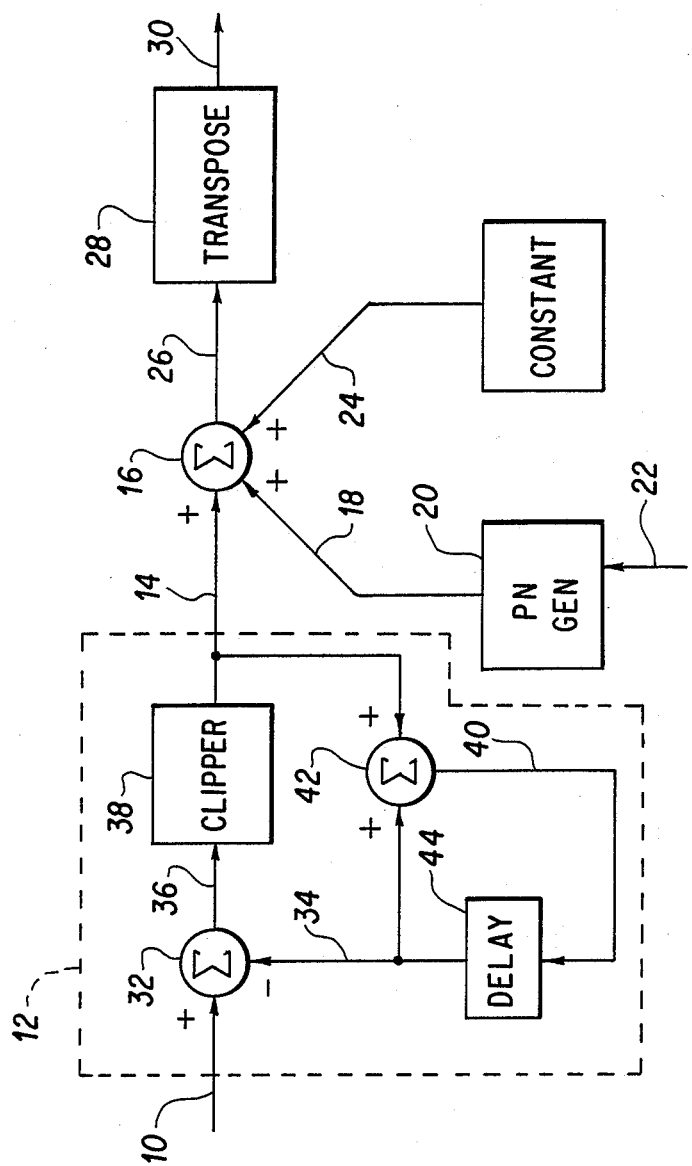
FIG. 1 is a flowchart of a scrambler in accordance with the present invention.

FIG. 1 shows a flowchart of the operation of a scrambler in accordance with the present invention. A clear, i.e., unenciphered, video signal 10 is input to a video transition limiter 12 which limits the size of changes in the amplitude of the video signal 10. The operation of the limiter 12 is described in greater detail below. A signal 14 output from the limiter 12 is then added by a summer 16 to an output signal 18 from a pseudo random number (PN) generator 20. A suitable PN generator 20 produces an output which is a random variable having a predetermined probability density and an amplitude range comparable to that of the limiter output signal 14. By combining the random signal 18 with the limiter signal 14, the clear video is encrypted. As described in more detail below, a suitable reset signal 22 is provided as an input to the PN generator 20 for synchronizing pseudo random number generators included in the scrambler and a descrambler. Also input to the summer 16 is a constant signal 24 which shifts the level of the output 26 of the summer 16. Level shifting is sometimes needed to allow the scrambled signal to conform with a TV signal transmission standard such as RS-170. The enciphered, level-shifted video signal 26 is then input to a transposer 28 which, as described in greater detail below, reduces the power bandwidth needed to transmit the scrambled video signal. A signal 30 output from the transposer 28 is finally the scrambled video signal for transmission to a descrambler and a receiver.

The video transition limiter 12 which limits the size of changes in the amplitude of the video signal is a form of delta-modulator which differentiates the video signal. The limiter 12 includes a summer 32 which forms the difference between the input clear video signal 10 and a feedback signal 34. The difference output 36 of the summer 32 is passed to a hard signal clipper 38 which prevents the difference signal from changing from its present value by more than a predetermined fraction of its dynamic range. For example, if the dynamic range of the difference signal is thirty-two units, the clipper 38 would limit changes in the signal to one-fourth of the range, i.e., eight units. An output of the clipper 38 is the output signal from the transition limiter 12 which is also fed to an integrator formed by another summer 42 and a delay element 44. With regard to a video signal, the delay element produces a temporal signal delay corresponding to one pixel.

The transition limiter 12 effectively limits any differences in signal amplitude between adjacent pixels to less than the predetermined fraction of the dynamic range set by the hard clipper 38. The predetermined fraction of the difference signal's dynamic range is generally determined by the number of discrete signal levels which are to be transmitted through the communication channel. This determines the resolution required of the channel. The number of signal levels is usually determined by an engineering tradeoff among the channel characteristics of large-signal or power bandwidth, settling time to within a given window, linearity and noise level evaluated in a context of a fixed range of signal amplitude. Abrupt large-amplitude signal transitions due, for example, to sudden illumination or average intensity changes are spread over several pixels, each of which is enciphered with a different sample of the PN signal. This contributes to the removal of all recognizable vestiges of the clear video from the scrambled signal. On the other hand, the transition limiter 12 passes small-amplitude pixel differences unmodified.

Table 1 illustrates the operation of the transition limiter 12 for an input clear video signal having a dynamic range of sixteen units with extremes of zero and fifteen units. The clipper 38 has a dynamic range of eight units with extremes of −3 units and +4 units. In the Table, $P_i$ is an arbitrary pixel index; CV (10) is the clear video input 10; FS (34) is the feedback signal 34; SO (36) is the difference output signal 36 from summer 32; LO (14) is the transition limiter output 14; and SO (40) is the output signal 40 from summer 42.

TABLE 1

| $P_i$ | CV (10) | FS (34) | SO (36) | LO (14) | SO (40) |
|---|---|---|---|---|---|
| 1 | 1 | 1 | 0 | 0 | 1 |
| 2 | 14 | 1 | 13 | 4 | 5 |
| 3 | 14 | 5 | 9 | 4 | 9 |
| 4 | 14 | 9 | 5 | 4 | 13 |
| 5 | 14 | 13 | 1 | 1 | 14 |
| 6 | 14 | 14 | 0 | 0 | 14 |
| 7 | 11 | 14 | −3 | −3 | 11 |
| 8 | 11 | 11 | 0 | 0 | 11 |

In the Table, it is assumed that the limiter 12 begins with an output signal at pixel 1 which is just greater than the lower extreme, while the amplitude of the clear video signal at the adjacent pixel, pixel 2, is just below the top of the assumed video dynamic range. Such an abrupt change can result from quick changes in scene illumination, i.e. average intensity, or from high-contrast edges due to the arrangement and nature of objects within the scene. While the amplitude of the clear video 10 changed thirteen units within only one pixel and continued unchanged thereafter, the output signal 14 of the transition limiter 12 changed only four units and was non-zero for a limited period of four pixels. Thus, large-amplitude transitions in the clear video signal are limited and spread over several pixels by the transition limiter 12. On the other hand, small-amplitude transitions are not spread at all. As shown in the table, the small difference between the clear video pixel 6 and pixel 7 appears immediately at the limiter output.

From the Table it can be seen that the dynamic range of the output signal 14 from the transition limiter 12 is less than the range of the clear video input 10. This helps to reduce the large-signal bandwidth of the scrambled signal, allowing the use of less expensive components. Also, the limiter 12 contributes to the removal of all vestiges of the original clear video signal from the scrambled output by masking the average intensity of the clear video signal and destroying any correlation between activity within the transmitted scene and activity within the scrambled signal.

It will be understood that the summers 32 and 43, the delay element 44 and the clipper 38 can be realized in any suitable circuit hardware providing adequate dynamic range and frequency bandwidth. It may also be noted that the output 36 of summer 32 has a dynamic range twice as large as the clear video 10 or the limiter output 14.

The output signal 14 from the limiter 12 comprising a transition-limited clear video signal is input to a summer 16 which also receives an output 18 from a pseudo random number (PN) generator 20. The generator 20 can be realized by any suitable components and may, for example, conform to the Data Encryption Standard of the National Bureau of Standards. As is well-known, the generator 20 produces an output signal having an amplitude which is a pseudo random variable having a well-defined probability density. The range of the generator output is preferentially the same as the range of the limiter output 14 to provide most efficient encryption of the video signal. The output of the generator 20 is pseudo random because it eventually repeats itself, therefore the output of the generator may be said to be a sequence having a beginning and an end. For proper encryption of the video signal, the PN sequence is preferably longer than the total number of pixels in several video frames and is also a non-integer multiple of the number of pixels in a video frame.

The simple addition of the PN generator's output and the video signal to be encrypted allows a simpler hardware implementation of the scrambler and descrambler using a borrow and subtract algorithm, as explained below in connection with the transposer 28. Also, if noise in the transmission causes an error in a received encrypted pixel of one bit, the descrambled pixel will be in error by only one bit.

Also input to the summer 16 is a constant-amplitude signal 24 which, in concert with a transposer 28, shifts the level of the scrambled video output 30 so that the output 30 has desired transmission characteristics. Such characteristics may be those of the NTSC (RS-170) video transmission standard. The constant signal 24 is generally set at a level equal to the opposite of the largest negative signal output from the transition limiter 12. With a unipolarity output from the PN generator 20, the output 26 of the summer 16 is then a unipolarity signal but one having a dynamic range almost twice as large as those of the limiter output signal 14 and the PN output 18.

Accurate reproduction of images that include abrupt transitions over wide contrast ranges requires transmission channels that can support high slew rates, i.e. the channels have wide power bandwidths. Since most transmission channels have power bandwidths which are narrower than their small-signal bandwidths, some loss of image resolution arises when abrupt transitions occur. With a conventional video signal, these losses are acceptable because high-contrast transitions are infrequent and convey insignificant information. With a video signal which is encrypted in the manner of the present invention, high-contrast transitions are intentionally created in quantity, thus accurate decryption requires that the transmission channel's power bandwidth be substantially equal to the channel's small-signal bandwidth. An encryption system using direct transmission of the summer output signal 26 requires an excessive power bandwidth. In accordance with the present invention, a transposer 28 modifies the summer output 16 in a manner that halves the resolution required of the channel for recovery of the encrypted image, thereby also reducing the channel bandwidth needed to transmit accurately the encrypted signal output 30. Also, the transposer 28 contributes to the removal of all vestiges of the original clear video signal from the scrambled output.

To illustrate the transformation carried out by the transposer 28, let the transition limiter 12 be as already described. The range of the limiter output signal is thus from −3 to +4 units for a dynamic range of eight units; the dynamic range of the output 18 from the PN generator 20 is preferably, therefore, also eight units. If the PN output is positive polarity, the constant level 24 is then set to +3 units: i.e. the opposite of the largest negative signal output from the transition limiter 12. Under these conditions the summer output signal 2 ranges between zero and fourteen units for a dynamic range of fifteen units. As an example, let the output signal 2 be a digital signal taking on only integer values between and including zero and fourteen units. Then, for transposer input values less than a predetermined transposition value of eight units, the transposer outputs the input value unchanged. For input values greater than or equal to eight units, the transposer outputs the input value reduced by eight units. In the same way as the hard clipper 38, the predetermined transposition value is set by the number of discrete signal levels which are to be transmitted through the communication channel.

The operation of a digital scrambler in accordance with the present invention is conveniently illustrated in the following look-up table in which each column is associated with a value of a digital PN output signal 18 and each row is associated with a value of a digital transition limiter output 14. The elements of the look-up table are the values output from the transposer 28 and transmitted as the scrambled video signal 30.

TABLE 2

|  |  | PN OUTPUTS (18) | | | | | | | |
| --- | --- | --- | --- | --- | --- | --- | --- | --- | --- |
|  |  | 0 | 1 | 2 | 3 | 4 | 5 | 6 | 7 |
|  | −3 | 0 | 1 | 2 | 3 | 4 | 5 | 6 | 7 |
|  | −2 | 1 | 2 | 3 | 4 | 5 | 6 | 7 | 0 |
| TRANSITION | −1 | 2 | 3 | 4 | 5 | 6 | 7 | 0 | 1 |
| LIMITER | 0 | 3 | 4 | 5 | 6 | 7 | 0 | 1 | 2 |
| OUTPUTS | 1 | 4 | 5 | 6 | 7 | 0 | 1 | 2 | 3 |
| (14) | 2 | 5 | 6 | 7 | 0 | 1 | 2 | 3 | 4 |
|  | 3 | 6 | 7 | 0 | 1 | 2 | 3 | 4 | 5 |
|  | 4 | 7 | 0 | 1 | 2 | 3 | 4 | 5 | 6 |

It is readily observed from Table 2 that the dynamic range of the scrambled video signal is identical to those of the transition limiter output signal and the PN output signal, so the bandwidth of the communication channel needed for the scrambled signal has been reduced by the transposer.

Figure 2:
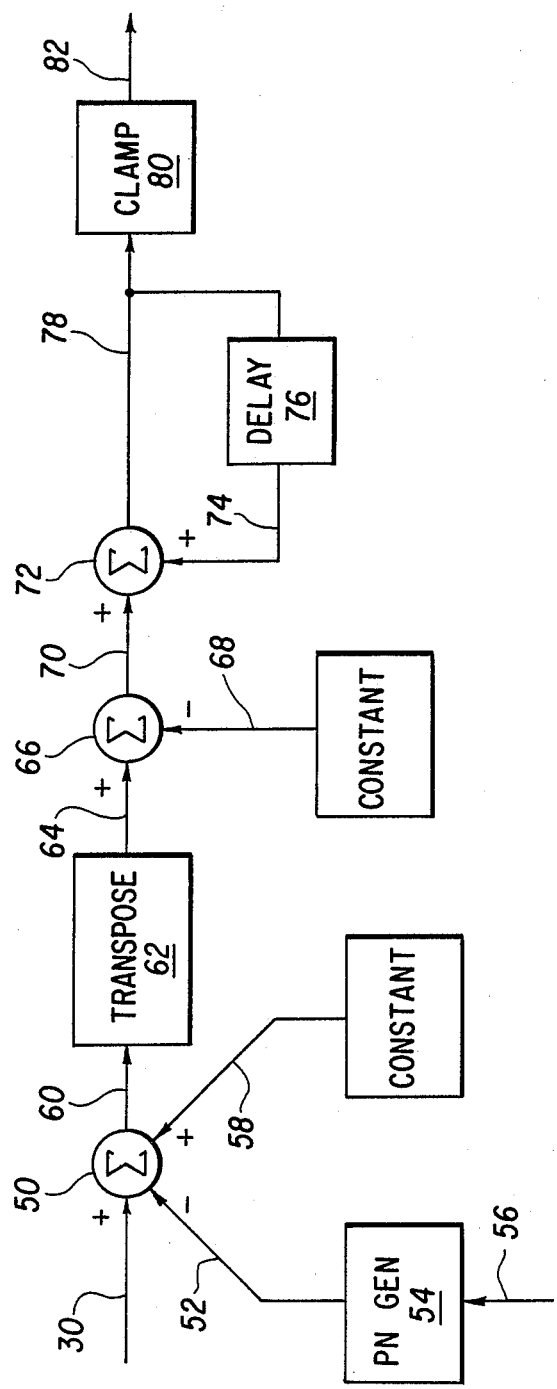
FIG. 2 is a flowchart of a descrambler according to the present invention.

FIG. 2 shows a flowchart of a descrambler in accordance with the present invention. A transmitted scrambled video signal 30 is input to a summer 50 which has another input 52 from another PN generator 54 and a further constant-level input 58. An output signal 60 from the summer 50 which is a first descrambled signal is then passed to a second transposer 62 which recovers the final descrambled signal. The final descrambled signal 64 represents the unscrambled information content of the transition-limited clear video signal. To recover substantially the clear video input, the amplitude level of the final descrambled signal 64 from the transposer 62 is then adjusted by a summer 66 which adds a second constant-level signal 68 to the transposer signal 64. The output signal 70 from the summer 66 is then passed to an integrator formed by a summer 72 and a delay element 76; the delay element 76 feeds the output 78 of summer 72 back as an input to the summer delayed by one pixel. The output 78 of the summer 72 is then passed to a clamp 80 which maintains the signal amplitude within the proper range. The output 82 of the clamp 80 is the descrambled clear video signal.

The PN generator 54 produces pseudo random output which is identical to that produced by the PN generator 20 shown in FIG. 1. The two generators 54 and 20, in the descrambler and scrambler, respectively, can be synchronized by any suitable technique. One such well-known synchronization method involves transmission of a known signal with a detection of that known signal at the receiver. When the known signal is detected, the PN generator at the receiver is reset using reset signal 56 at the same time as the PN generator at the transmitter is reset using reset signal 22, thereby synchronizing the two PN generators.

The addition of the constant-level 58 to the difference between the received scrambled video 30 and the PN output 52, together with the operation of the transposer 62 acts to reverse the transformation of the transmitted signal by the transposer 28. The constant-level input 58 is set equal to the predetermined transposition value of the transposer 28. In this case, the transposer 62 operates on the output signal 60 from the summer 50 in the same way as the transposer 28. Continuing the example, the transposer 62 outputs unchanged the signal 60 when the signal 60 is less than eight units. When the signal 60 is larger than or equal to eight units, the output 64 of the transposer 62 is the input value reduced by eight units.

Since the PN output 52 is synchronized to the PN output 18, the value of the PN signal is known at the descrambler. This knowledge, together with the known value of the transmitted scrambled signal, allows unique recovery of the unscrambled, transition-limited signal 14. In the example shown in Table 2, the PN output value and the transmitted scrambled signal (an element of the Table) are both known, therefore the limiter output is determined. Thus, in accordance with the present invention, the transposers 28 and 62 allow proper descrambling of the video signal without requiring excess channel large-signal bandwidth.

The transposer output 64 can then be passed to a summer 66 for shifting its level. The summer output signal 70 thereby is made identical to the transition limiter output 14 shown in FIG. 1. Integrating and clamping the signal 70 produces the descrambled video output signal 82 which has the same dynamic range and level as the input clear video signal 10. However, the descrambled output signal 82 does not have the abrupt large-amplitude transitions of the clear video input to the scrambler. This is perceived as a softening of the edges of only the high-contrast objects within the transmitted scene, but it provides the significant advantages of similarity of scrambler and descrambler hardware, and reduction of scrambled video transmission bandwidth. The perception of low-contrast objects within the transmitted scene is unaffected by the present method.

The scrambling system according to the present invention also uses the inherent response of the eye to compensate for the limiting of the amplitude difference between adjacent pixels. Since the eye tends to respond more to amplitude peaks than to amplitude valleys, an image having pixels in a 15-12-15-12 sequence will be perceived in much the same way as a high-contrast image having pixels in a 15-0-15-0 sequence. The transition limiter 12 as herein described substantially limits the difference between adjacent pixels, but by arranging the clipper 38 to have a relatively larger maximum positive output than the minimum negative output, i.e. $+4$ and $-3$ rather than $+3$ and $-4$, the scrambling system will reproduce a sufficiently long sequence of 15-0-15-0 pixels as a sequence of 15-12-15-12 pixels, which, due to the characteristics of the human eye, is perceived substantially identically.

The scrambling system of the present invention can also correct for some signal errors caused by the transmission channel; correctable errors include, for example, those resulting from DC balance or restoration shifts. For clear video signals having extended full-black or full-white periods, the scrambler advantageously transmits an encrypted signal corresponding to the appropriate extreme value of the limiter output 14. For example, in Table 1, for clear video input pixels (CV 10) having amplitudes of fifteen units, i.e. the top of the dynamic range, the limiter output LO (14) is maintained at $+4$; thus, if pixels 2-6 were a constant fifteen-unit level, the limiter output 14 at pixels 5 and 6 would be $+4$ rather than the one and zero shown in the table. In a related manner, the descrambler maintains the level of the received scrambled video within the video dynamic range by operation of the clamp 80 shown in FIG. 2. In this way, the contrast information content of the video signal is preserved despite DC balance shifts in the transmission channel.

Figure 3:
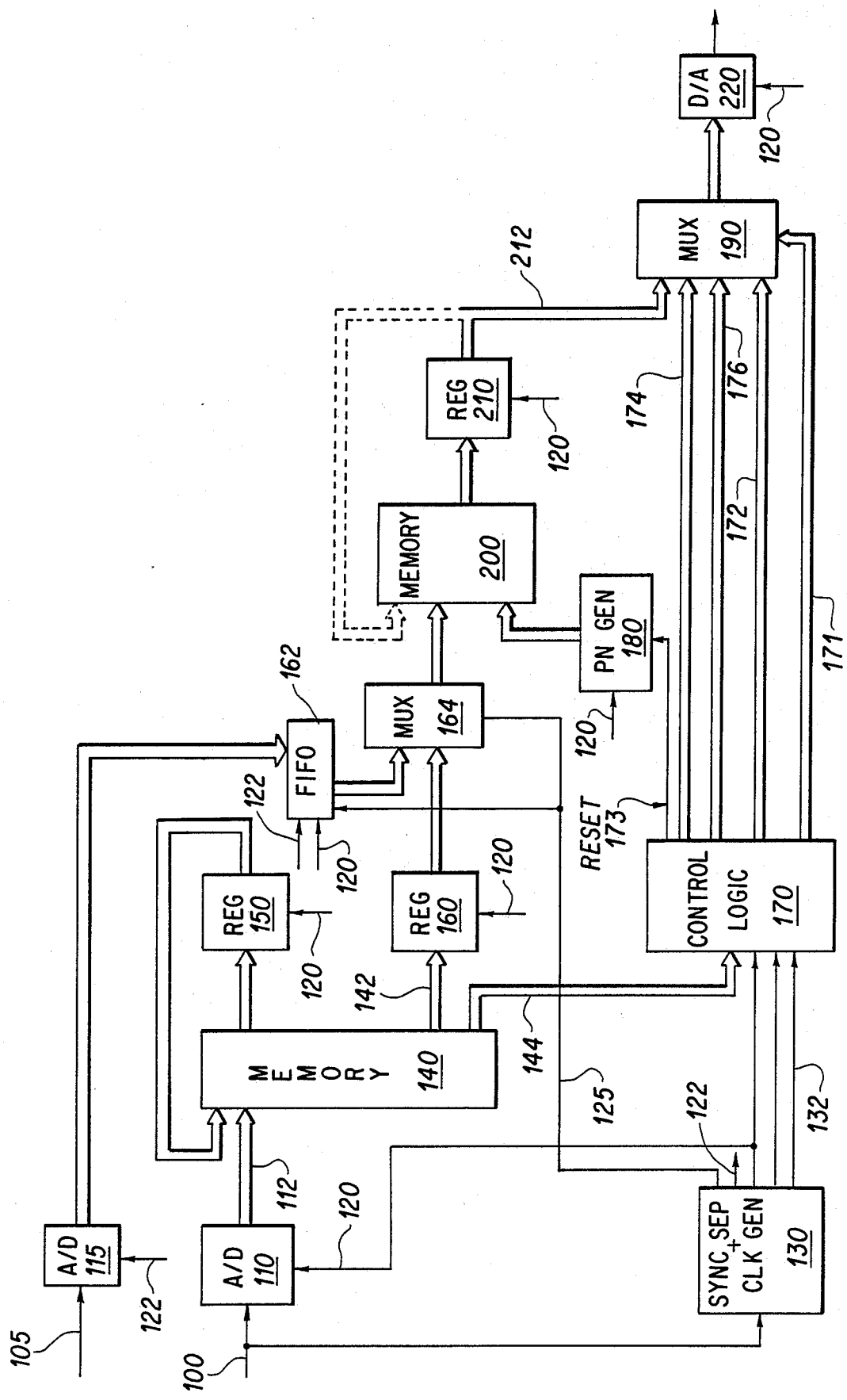
FIG. 3 is a block diagram of an embodiment of a scrambler/descrambler according to the present invention.

The method of the present invention can be implemented by suitable analog or digital circuits. FIG. 3 shows a block diagram of a digital embodiment of the present invention. An input clear signal 100, which for example can be an analog TV signal is digitized by an analog-to-digital converter 110. Suitable converters can digitize TV signals to a resolution or dynamic range of 6-bits, although only 3-bits can provide adequate pixel amplitude resolution. The converter 110 samples each pixel of the input signal 100 according to a pixel clock signal 120 which has a typical frequency of four megahertz. For applications requiring better image resolution a system using an eight megahertz clock can be provided. The PCLK signal 120 is generated by a conventional circuit 130 (typically including a phase-locked loop) from the input signal 110 which includes synchronization pulses in accordance with the RS-170 TV transmission standard. The remainder of the video digital circuits are also synchronized to the PCLK signal 120.

The circuit 130 also generates an audio control signal 125 which is used to control the combining of the video signal 100 with one or more audio signals 105 that may be digitized by another analog-to-digital converter 115. Only one audio signal and one converter are shown in the Figure. The converter 115 samples the audio signal 105 according to an audio clock signal 122 which has a typical frequency greater than thirty kilohertz and is generated by the circuit 130.

The samples 112 of the input video signal are passed to a memory device 140 which can be either a random-access type or a read-only type. For the scrambler, a delay in the signal of one pixel is provided by a register 150 which has its output fed back to the memory device 140. The register 150 is not used in the descrambler. The memory 140 and the register 150 can be used in a well-known manner, for example as a look up table, to implement all the functions of the transition limiter 12 shown in FIG. 1. A signal output 142 of the memory 140 is passed to a second register 160 for latching its value. Control signal outputs 144 from the memory device 140 which include full-white-level information for automatic gain control and flag signals for indicating whether a given bit is even or odd are input to a control logic device 170.

The control logic 170 responds to the sync pulses 132 and video amplitude information produced by the circuit 130 to control the operation of a pseudo random sequence generator 180 and a digital multiplexer 190. The control logic 170 may be realized in logic circuits such as PALs suitable for implementing Boolean expressions. Suitable control signals 171 cause the multiplexer 190 to select one of the signals 172, 174, 176 and 212 for the output to a digital-to-analog convertor 220. The control logic 170 also generates the predetermined scrambled signal 172 which, after being passed by the multiplexer 190 and transmitted, allows synchronization of the descrambler's PN sequence generator with the scrambler's PN generator 180. The PN generator 180 is reset by RESET signal 173 when the predetermined scrambled signal 172 is transmitted.

The output video signal from the register 160 is passed to a multiplexer 164 where it is combined with the audio signal samples from the audio converter 115. To match the audio and video sampling rates, a FIFO memory 162 is provided which is driven by the clock signals 120 and 122. The FIFO 162 operates in a conventional pipeline manner to store the samples of the audio signal generated at the low audio clock rate during a field or frame of the TV signal. The stored audio samples are then read from the FIFO at the higher pixel clock rate and inserted by the multiplexer 164 into the TV signal at a convenient time such as during an unused horizontal scan line. The operation of the multiplexer 164 and the FIFO 162 are controlled conventionally by the audio control signal 125. By combining the digitized video and audio signals in this way, encryption of the audio signal is efficiently provided by the same circuitry and in the same manner as the video signal is encrypted.

The PN sequence generator 180 is any suitable circuit having a resettable output. For example, a generator having a 20-bit sequence may be employed. Three bits of the sequence are combined with the signal contents of the register 160 to scramble or descramble the video signal. A generator outputting a 20-bit sequence repeats itself after 1,048,576 pixels. The generator should be reset at known intervals exceeding 1 frame time to preserve adequate randomization of the video signal from frame to frame, and to allow resynchronization at a convenient time independent of PN sequence length. A RESET signal 173 generated by the control logic 170 in response to either the pixel clock 120 or the synchronization signals 132 resets the PN generator 180 at the proper time.

The outputs from the PN generator 180 and the multiplexer 164 are passed to a second programmable memory device 200 which can, for example, contain Table 2 and use it as a simple look-up table for generating an output signal to a third register 210. The functions of the summer 16 and transposer 28 as well as those of the summer 50 and the transposer 62 can thus be efficiently implemented in circuit hardware. Since the identical circuitry may be used for both the scrambler and descrambler, FIG. 3 also shows a dashed-line feedback path from the register 210 to the memory 200 for implementing the descrambler functions of the summer 72, the delay element 76 and the clamp 80 shown in FIG. 2. In this way, a single piece of electronic hardware can operate as either a scrambler or descrambler in point-to-point, multipoint-to-point, and point-to-multipoint networks.

The output of the register 210, comprising either the scrambled combined video and audio signals (in the scrambler) or the descrambled signals (in the descrambler) is passed to a multiplexer 190 which combines it with the TV sync pulses 174 and black level signal 176. The pulses 174 and level signal 176 are conventionally derived from the control logic 170. The output of the multiplexer 190 is then converted to an analog signal by a digital-to-analog converter 220 for either transmission or display. Additional conventional circuits for separating the audio signal from the video signal, slowing the rate of the audio to its original sampling rate, and converting the digitized audio back to an analog signal are not shown in the FIG.. In the scrambler, an additional input to the multiplexer 190 is the predetermined scrambled signal 172 from the control logic 170 which is used to synchronize the PN generators in the scrambler and the descrambler.

It is, or course, possible to embody the invention in specific forms other than those of the preferred embodiment described above. This may be done without departing from the spirit of the invention. The preferred embodiment is merely illustrative and should not be considered restrictive in any way. The scope of the invention is given by the appended claims rather than the preceding description and all variations and equivalents which fall within the range of the claims are intended to be embraced therein.

What is claimed is:

1. A method of providing secure communication via electromagnetic signals, comprising the steps of:
    limiting changes in amplitude of an input clear signal;
    generating a first pseudo random signal;
    transforming the limited input clear signal in accordance with the first pseudo random signal to produce a scrambled signal;
    transposing the scrambled signal to reduce a bandwidth of a communication channel required for accurate transmission of the scrambled signal;
    accurately transmitting the transposed scrambled signal;
    generating a second pseudo random signal; transforming a received transposed scrambled signal in accordance with said second pseudo random signal to produce a first descrambled signal; and
    transposing the first descrambled signal to reverse the transposition of said scrambled signal to recover a final descrambled signal.

2. The method of claim 1, wherein the step of limiting changes in amplitude of an input clear signal includes differentiating the input signal.

3. The method of claim 1, further including the step of selectively transmitting a predetermined transposed scrambled signal for synchronizing the first and second pseudo-random signals.

4. The method of claim 1 wherein said limiting step includes a relatively larger maximum positive output -their a minimum negative output.

5. The method of claim 1, wherein said transforming step includes shifting the amplitude level of said scrambled signal.

6. A system for providing secure communication via electromagnetic signals, comprising:
    means for limiting changes in amplitude of an input clear signal;
    means for generating a first pseudo random signal;
    means for transforming the limited output clear signal in accordance with the first pseudo random signal to produce a scramble signal;
    means for transposing the scrambled signal to reduce a bandwidth of a communication channel required for accurate transmission of the scrambled signal;
    means for generating a second pseudo random signal;
    means for transforming a received transposed scrambled signal in accordance with said second pseudo random signal to produce a first descrambled signal; and
    means for transposing the first descrambled signal to reverse the transposition of said scrambled signal to recover a final descrambled signal.

7. The system of claim 6, wherein the means for limiting changes in amplitude of an input clear signal includes means for differentiating the input signal.

8. The system of claim 6, further including means for selectively transmitting a predetermined transposed scrambled signal for synchronizing the first and second pseudo-random signals.

9. The system of claim 6, wherein said limiting means includes a clipper for providing a relatively larger maximum positive output than a minimum negative output.

10. The system of claim 6, wherein said transforming means includes means for shifting the amplitude level of said scrambled signal.

11. The system of claim 6, further including means for resetting at least one of said first means for generating the first pseudo random signals and said second means for generating the second pseudo random signals after a predetermined length of the output clear signal.

12. The system of claim 11, further including means for selectively transmitting a predetermined scrambled signal for synchronizing said first and second pseudo random generating means.

* * * * *